Dec. 13, 1938.   A. E. BULLINGTON   2,139,876
BRAKE LINING CLAMP
Filed July 14, 1934
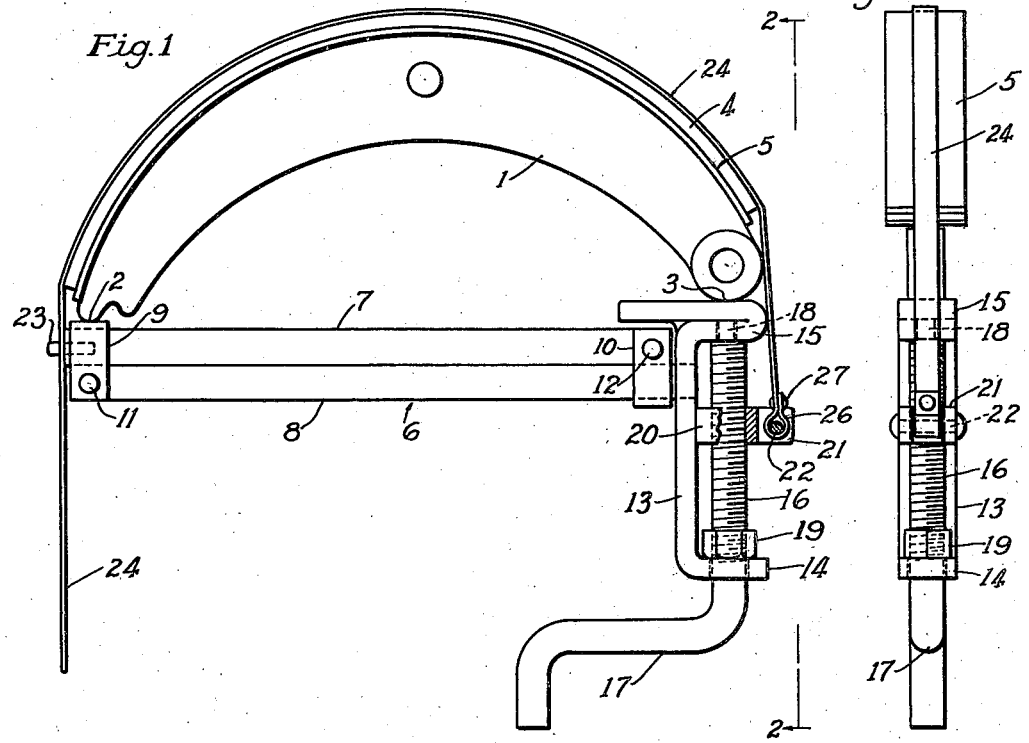
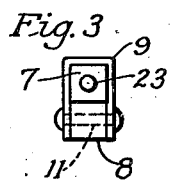
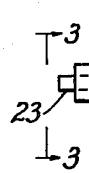
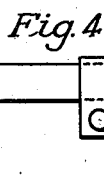
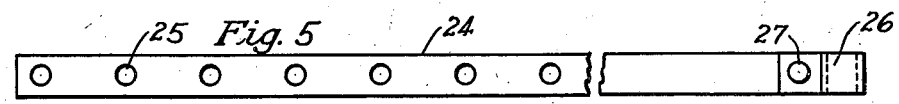
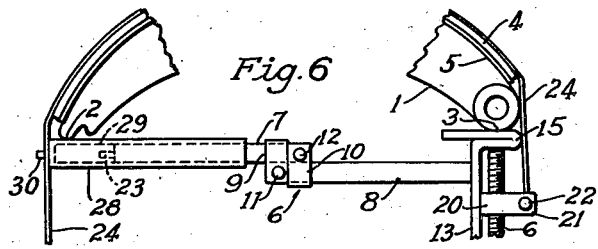
INVENTOR.
A. E. Bullington
BY Carlos G. Stratton
ATTORNEY.

Patented Dec. 13, 1938

2,139,876

UNITED STATES PATENT OFFICE 2,139,876

BRAKE LINING CLAMP

Aubrey E. Bullington, Huntington Park, Calif., assignor of one-third to Walter P. Evans and one-third to Frank J. Dresman, both of Huntington Park, Calif.

Application July 14, 1934, Serial No. 735,225

8 Claims. (Cl. 29—84.7)

My invention relates to devices for clamping brake linings to brake shoes, during the operation of drilling and countersinking the lining and then riveting same to the shoe. Reference is made to my co-pending application Serial No. 12,841, filed March 25, 1935 for matter shown but not claimed herein.

An important object of my invention is to provide such a device that will be adaptable for widely different sizes of brake shoes, without any substitution of parts.

Other objects reside in providing a secure anchorage for a clamping band comprised in the invention, and in providing simple, manually operable means by which considerable tension can be placed on said band.

Still other objects reside in novel details of construction and in novel combinations and arrangements of parts, which will appear in the course of the following description.

In the drawing like reference characters designate similar parts in the several views.

Figure 1 is a face view of an embodiment of my invention, showing a brake shoe and brake lining in position.

Figure 2 is an end elevation taken on the line 2—2 of Figure 1.

Figure 3 is an end elevation taken on the line 3—3 of Figure 4.

Figure 4 is a broken elevation, showing an extensible cross bar, comprised in the invention, in an extended position.

Figure 5 is a broken plan view of a band employed with said embodiment.

Figure 6 is a broken face view showing a modification applied to a larger brake shoe.

Referring more in detail to the drawing, the reference character 1 designates a brake shoe having ends 2 and 3. A brake lining 4 is shown applied to face 5 of the brake shoe. Thus far is conventional construction.

The embodiment of my invention shown in the drawing comprises an extensible cross bar generally designated by the numeral 6. The cross bar is composed of sections 7 and 8. The sections are square in section, as shown in Figure 3 and are slidable one on the other. Holding the sections in such relation are U-shaped clips 9 and 10. The clips are inverted with relation to each other and pins 11 and 12 respectively fasten the clips 9 and 10 to the bars 8 and 7. Each bar is slidable in the clip on the other bar.

Mounted on the bar 8 at an end thereof is a head 13 having journals 14 and 15. Rotatably supported in the journals is a threaded shank 16 of a crank 17. The shank 16 has a tenon 18 rotatable in the journal 15. The shank carries a collar 19 that abuts the journal 14 and is permanently mounted on the shank by any suitable means.

In threaded engagement with the shank 16 is a traveling block 20 provided with spaced ears 21 and a pin 22 spanning the space between the ears.

The section 7 of the cross bar has an integral hook 23 projecting from the outer end thereof away from the head 13. A flexible clamping band 24 is perforated adjacent one end thereof, as illustrated at 25. The desired opening 25 is engaged by the hook 23. The other end of the band has a loop 26 that is bolted around the pin 22, as shown at 27.

When it is desired to obtain a longer cross bar than is afforded by the sections 7 and 8, an extension member 28, provided with a socket 29, is slid over the projecting end of the section 7. The socket 29 extends substantially the length of the extension member and is square in section, to snugly fit over the section 7. A hook 30 is mounted at the end of the member 28, for engagement with perforations of the band 24.

In the use of my invention, the journal 15 also serves the purpose of being a rest for end 3 of the brake shoe. The other end 2 of the shoe rests on clip 9 when the sections 7 and 8 are in a contracted position. The contracted relation of the sections 7 and 8, as they are shown in Figure 1, accommodates the smallest size of brake shoe. When larger sizes are to be relined, the sections are extended, in which case, the end 2 of the shoe rests on section 7, as suggested in Figure 4.

For extremely large brake shoes, the extension member 28 is used. It has been heretofore described and is shown in Figure 6.

In the two forms, the hook 23 or 30 engages a perforation of the band 24. The band is then drawn tightly around the lining 5 on the brake shoe 1 by means of clockwise rotation of the crank 17, which causes the traveling block to move along the threaded shank 16, away from the journal 15.

The band 24 being narrower than the lining, the lining may be drilled and countersunk at either side of the band. The lining may then be riveted to the brake shoe.

It is to be understood that the binding effect of the threads in the traveling block 20 upon the threads on the shank 16 will hold the band in its adjusted positions, when the latter is clamped around the lining 5.

The clips 9 and 10 not only slidably hold the sections 7 and 8 one upon the other, but by abutting each other they provide a stop for outward movement of the section 7 relative to the head 13.

Having thus described my invention, what I claim and desire to secure by Letters Patent is:

1. In a tool for clamping linings to brake shoes, a cross bar for resting a brake shoe thereon, a band for clamping a lining on the shoe, means on the cross bar holding one end of the band, a crank rotatably mounted on the cross bar and having a threaded shank, and a traveling block on the shank connected with the other end of the band.

2. In a tool for clamping linings to brake shoes, means for the support of a brake shoe, a band for passing around a lining on a brake shoe, one end of the band being held relatively stationary on said means, a journal on said means, screw means mounted in the journal to prevent longitudinal movement of said screw means but to permit rotation thereof, a traveling block on the screw means connected with the other end of the band, and a crank on the screw means to tighten the band around a lining by rotation of the crank.

3. In a tool for clamping linings to brake shoes of different sizes, an extensible cross element of sufficient length to span the space between the opposite ends of a brake shoe, the cross element having rests for both ends of a brake shoe, a clamping band to hold a lining on a shoe whose opposite ends rest on the cross element, the extensible cross element comprising relatively movable members, whereby to accommodate brake shoes of varying sizes, one of said members being connected with one end of the clamping band to hold said end relatively stationary, and means on the other member connected with the other end of the band for tightening the band around a lining.

4. A clamping tool according to claim 3, in which the movable members of the cross element have rests respectively for the two opposite ends of the brake shoe.

5. In a tool for clamping linings to brake shoes of different sizes, an extensible cross element of sufficient length to span the space between the opposite ends of a brake shoe, the cross element having rests for both ends of a brake shoe, a clamping band to hold a lining on a shoe whose opposite ends rest on the cross element, the extensible cross element comprising relatively movable members slidable one on the other, whereby to accommodate brake shoes of varying sizes, one of said members being connected with one end of the clamping band to hold said end relatively stationary, and means on the other member connected with the other end of the band for tightening the band around a lining.

6. In a tool for clamping linings to brake shoes of a predetermined minimum size, an extensible cross element of sufficient length to span at least the space between the ends of a minimum sized brake shoe, the cross element providing rests for both ends of the brake shoe, a clamping band to hold a lining on a shoe whose ends rest on the cross element, and anchoring and tightening means on the cross element, for respectively holding and drawing the band and thereby applying pressure upon the band, the shoe and the lining in a direction toward the spanning member of said cross element, whereby to hold the assembly during riveting.

7. A tool for clamping linings to brake shoes, comprising a frame for supporting a brake shoe, a band for passing around a lining on the brake shoe, means holding one end of the band stationary on the frame, the frame having a substantially straight side, screw means journaled substantially parallel with said side, and a traveling block on the screw means fastened to the other end of the band, the block being movable along said side, said side being arranged to engage and prevent the block from turning with the rotary movements of the screw means.

8. In a tool for clamping linings to brake shoes, a unitary cross element of sufficient length to span the space between the ends of a brake shoe, the cross element providing rests for both ends of a brake shoe, one of the rests being slidable relative to the other, a clamping band to hold a lining on a shoe whose ends bear on the rests, means holding one portion of the band relatively stationary with respect to the cross element, and means on said element connected with another portion of the band and arranged to draw the band tightly around the lining on the shoe, whereby the lining may be fastened in place upon the shoe.

AUBREY E. BULLINGTON.